(12) United States Patent  
Jackson

(10) Patent No.: US 11,109,600 B2  
(45) Date of Patent: Sep. 7, 2021

(54) SYSTEM AND METHOD FOR A PELLET-FIRED SMOKER

(71) Applicant: Jordan Jackson, Longview, TX (US)

(72) Inventor: Jordan Jackson, Longview, TX (US)

(*) Notice: Subject to any disclaimer, the term of this patent is extended or adjusted under 35 U.S.C. 154(b) by 55 days.

(21) Appl. No.: 16/741,722

(22) Filed: Jan. 13, 2020

(65) Prior Publication Data

US 2020/0221717 A1 Jul. 16, 2020

Related U.S. Application Data

(60) Provisional application No. 62/792,358, filed on Jan. 14, 2019.

(51) Int. Cl.

| | |
|---|---|
| *A23B 4/052* | (2006.01) |
| *A47J 37/07* | (2006.01) |
| *F23L 9/06* | (2006.01) |
| *F23B 30/00* | (2006.01) |

(52) U.S. Cl.

CPC ........... *A23B 4/052* (2013.01); *A47J 37/0704* (2013.01); *A47J 37/0754* (2013.01); *A47J 37/0786* (2013.01); *F23B 1/38* (2013.01); *F23L 9/06* (2013.01)

(58) Field of Classification Search

CPC ............... A47J 37/0754; A47J 37/0704; A47J 37/0786; A23B 4/0523; A23B 4/052; F23L 9/06; F23B 1/38

See application file for complete search history.

(56) References Cited

U.S. PATENT DOCUMENTS

| | | | | |
|---|---|---|---|---|
| 5,001,993 | A * | 3/1991 | Gramlow | F23B 1/30 110/110 |
| 2007/0137503 | A1* | 6/2007 | Traeger | A23B 4/052 99/482 |
| 2007/0221199 | A1* | 9/2007 | Hake | F24C 15/205 126/299 R |
| 2010/0218754 | A1* | 9/2010 | Kuntz | A47J 37/0786 126/25 R |
| 2013/0298894 | A1* | 11/2013 | Kleinsasser | A47J 37/0704 126/25 R |
| 2014/0326232 | A1* | 11/2014 | Traeger | A47J 37/0786 126/25 R |

* cited by examiner

*Primary Examiner* — Alfred Basichas  
(74) *Attorney, Agent, or Firm* — Bell Nunnally & Martin LLP

(57) ABSTRACT

This invention relates in general to a pellet-fired smoker which includes a housing having a smoke chamber defined within it. A hopper holding pellet fuel supplies pellets through one or more augers to one or more fire pots configured to enhance smoking a food product by increasing the smoke flowing to a food product at various cooking temperatures.

10 Claims, 2 Drawing Sheets

SYSTEM AND METHOD FOR A PELLET-FIRED SMOKER

CROSS-REFERENCE TO RELATED APPLICATIONS

This patent application claims priority to U.S. Provisional Patent Application Ser. No. 62/792,358, filed Jan. 13, 2019, which is incorporated herein by reference.

BACKGROUND

Technical Field

This invention relates to a pellet-fired smoker and, more particularly, to a cooker utilizing multiple fire pots.

Background

Grilling and warming food products typically involves the use of a grilling device having a cooking section. The cooking section of such grilling devices is heated by means of a heat source, which is often disposed within the cooking section. Typical heat sources include electric filaments and combustible fuels, such as charcoal, wood, and gas (e.g., propane, butane, etc.). Outdoor combustion-style grills, in particular, have been developed to provide a convenient means for cooking food without the need for a traditional indoor oven or range.

Pellet fuel has been recognized as an inexpensive and clean burning fuel with smoke that imparts the flavor of a wood-based fire to food. Such pellets are conventionally prepared by pelletizing wood waste under heat and pressure to produce a product of substantially uniform size. The use of solid pellets as a fuel source is known in the art of self-contained stoves and barbeques. For example, U.S. Pat. Nos. 4,823,684 and 6,223,737, each of which are incorporated herein by reference, describe barbeque devices that both smoke and cook food by the burning of pellet fuel. Pellet-fired cooking grills normally utilize compressed pellets of wood or other material as the source of heat used to cook foods. The pellets may be made from a variety of materials including sawdust and other residues, and typically have lengths ranging from one half to one and one half inches. Another example of what might be thought of as pellet fuel is comminuted poplar, or comminuted residue such as corn husks or nut shells. Whatever the particular description of the fuel, the fuel characteristically has a fairly uniform size, can be handled in a storage facility such as a hopper, and burns evenly when ignited and supplied with combustion-supporting gas such as air.

Some grills may include adjustable heat settings designed to regulate temperature within the cooking section, thereby allowing a user to cook the food at a high heat and then reduce the temperature within the cooking section to maintain the food in a warm state. Unlike stoves or barbeques, smoke generators do not include a means for supporting or storing the food to be prepared. Instead, smoke generators may be attached, as by tubing or piping, to a separate "smoker" or "smokehouse" unit with racks supporting the food to be smoked and/or cooked. Having separate devices for generating smoke and storing food allows for greater temperature adjustability and smoke purification. For instance, smoke in a self-contained stove or barbeque unit may reach the food at a temperature of 400° F. whereas smoke may enter a smokehouse from a smoke generator at 120 to 140° F., allowing for a wider range of applications, in the art of smoke generators, only fuel such as sawdust or charcoal is known, as can be found in U.S. Pat. Nos. 4,270,464 and 6,705,213, both of which are hereby incorporated by reference. Charcoal is known to be an expensive fuel source, can be messy to handle, and requires significant time to ignite. Further, both charcoal and sawdust fuel are known to impart creosote chemicals, hydrocarbons, and other chemicals to the food being smoked or cooked, which may be unhealthy and can leave food with a bitter taste.

A variety of solutions have been presented to avoid the dilemma presented above. For instance, the food product may be covered with foil to keep the food from being overcooked while still allowing a sufficient amount of smoke to permeate. However, simply covering the food product may not keep the food from overcooking. Some manufactures have developed grills with a raised cooking section rack to hold certain food products away from the heat source within the cooking section and thereby cook different food products at different temperatures or rates while still allowing all the food products to absorb the smoke flavor. However, food products can still become overcooked on the raised rack as the heat circulating within the cooking section continues to raise the temperature or maintain a higher temperature of the food. Moreover, monitoring and orchestrating the precise timing appropriate for moving the cooking food to the raised rack can detract from the ease of food grilling.

Some specialty grilling devices provide a second cooking section having a second heating source disposed therein. While such grilling devices may overcome certain problems associated with the need to simultaneously cook and smoke food products, or to cook different food products at different temperatures or rates, such grilling devices do not provide the ability to vary an amount of smoke and an amount of heat independently. Often, the more smoke provided, the higher the temperature and vice versa.

Flavoring briquettes or pellets are commonly used as cooking fuel due to their ability to impart flavor to food during the cooking process. A pellet imparts flavor when smoke released from the pellet during combustion carries flavor to the food. Flavoring pellet examples in the prior art include U.S. Pat. No. 4,102,653, which incorporates spices into a briquette, and U.S. Pat. No. 4,960,438, which incorporates olive oil into a briquette. These briquettes impart certain flavors to food, but they do not provide the characteristic smoked wood flavor of food cooked over an open flame.

Pellets comprising mixtures of wood have been manufactured to provide wood flavor during cooking. Generally, wood that imparts flavor, known as flavor wood, and a wood that does not impart flavor, known as base wood, have been combined to produce pellets that impart wood flavor into food. Mixtures of base and flavor woods have been used because if a wood pellet was made entirely from a flavor wood, then food cooked with that pellet may taste too strong to appeal to most persons.

Accordingly, manufacturers can harvest flavor wood and base wood to blend together in ratios that produce pellets with a desired flavor level. Because flavor wood and base wood are often found in substantially different locations, the flavor wood is typically shipped to a central location for pellet manufacturing. Shipping flavor wood in solid form over substantial distances can result in significant expense. In addition, it is often costly to accurately mix flavor wood and base wood to the desired ratio in solid form. Thus, using solid flavor wood to manufacture flavored wood pellets results in numerous disadvantages.

Accordingly, there are a number of disadvantages in existing grilling devices and systems that need to be addressed. It would, therefore, be beneficial to provide a grilling device or system that includes an efficient mechanism for independently controlling the amount of heat flowing to a food product and the amount of smoke being applied to that same food product.

SUMMARY OF THE INVENTION

This invention relates in general to the field of pellet-fired grills and smokers. In various embodiments, a smoker is provided that may improve a chef's ability to control the amount of wood smoke flavor imparted to items cooked in the smoker as compared to gas-fired barbecues or other pellet-fed grills. In various embodiments, the smoker may utilize flavored and/or unflavored pellets, such as wood pellets, as a source of heat. In some embodiments, the smoker may include multiple augers for delivering the wood pellets to multiple fire pots. In some embodiments, the smoker may include two augers leading to separate fire pots. In some embodiments, the smoker may include a single hopper that is divided or may include multiple hoppers. Multiple hoppers, or a single divided hopper, may allow each auger to have its own source of pellets and may allow more flexibility in blending different pellets.

In some embodiments, the smoker may include a first auger leading to a first fire pot and a second auger leading to a second fire pot. The first fire pot may be located above the second fire pot, closer to the grilling surface than the second fire pot, next to the second fire pot, and/or below the second fire pot. The first fire pot and first auger may be used to control the temperature using one or more heat controls, such as adjusting a fire rod that heats the pellets, adjusting a convection fan to vary the oxygen delivered to the fire, adjusting the speed at which the auger delivers pellets to the fire pot, adjusting the type of pellets being delivered to the fire pot, and/or other controls. The second auger may be used to send pellets to the second fire pot allowing them to smolder and, thereby, create more smoke inside the cooking area. In some embodiments, the second fire pot may have a perforated lid to govern the second fire pot. The perforated lid may be adjustable to provide additional control over an amount of smoke created.

In some embodiments, the first fire pot may be utilized to create a first flow of heat and smoke and the second fire pot may be utilized to produce a second flow of heat and smoke. In some embodiments, when the smoke from the second fire pot rises, it will become part of the first flow of heat and smoke to create more smoke without a significantly higher cooking temperature. In some embodiments, a metal heat shield may be located above the fire pots to avoid excessive amounts of heat and provide a convection-type heating to promote even and sustained cooking of a variety of different food products. In some embodiments, the smoker may have an adjustable smoke stack to provide additional control of the flow of heat and smoke. In some embodiments, the smoke stack may be able to be adjusted vertically and/or the diameter of the stack may be variable.

In some embodiments, the smoker may have a rectangular design to allow even cooking with less hot spots. In some embodiments, the smoker may include a plurality of racks. In some embodiments, the smoker may have insulated interior walls to help hold in heat and maintain a more constant temperature inside. In some embodiments, the smoker may have a sloped drip pan for grease to run down to a drain pipe so the grease and waste can exit the smoker. The drain pipe may include a gate valve on it to control the flow of grease and waste.

The above summary of the invention is not intended to represent each embodiment or every aspect of the present invention. Particular embodiments may include one, some, or none of the listed advantages.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

The present invention is directed towards systems and methods for an enhanced pellet-fed smoker. In various embodiments, the smoker may improve the flavorful wood smoke imparted to items cooked in the smoker as compared to gas-fired barbecues or other pellet-fed grills. In various embodiments, the smoker may utilize flavored and/or unflavored pellets, such as wood pellets, as a source of heat. In some embodiments, the smoker may include multiple augers for delivering the wood pellets to multiple fire pots. In some embodiments, the smoker may include two augers leading to separate fire pots. In some embodiments, the smoker may include a single hopper that is divided or may include multiple hoppers. Multiple hoppers, or a single divided hopper, may allow each auger to have its own source of pellets and may allow more flexibility in blending different pellets.

Figure 1:
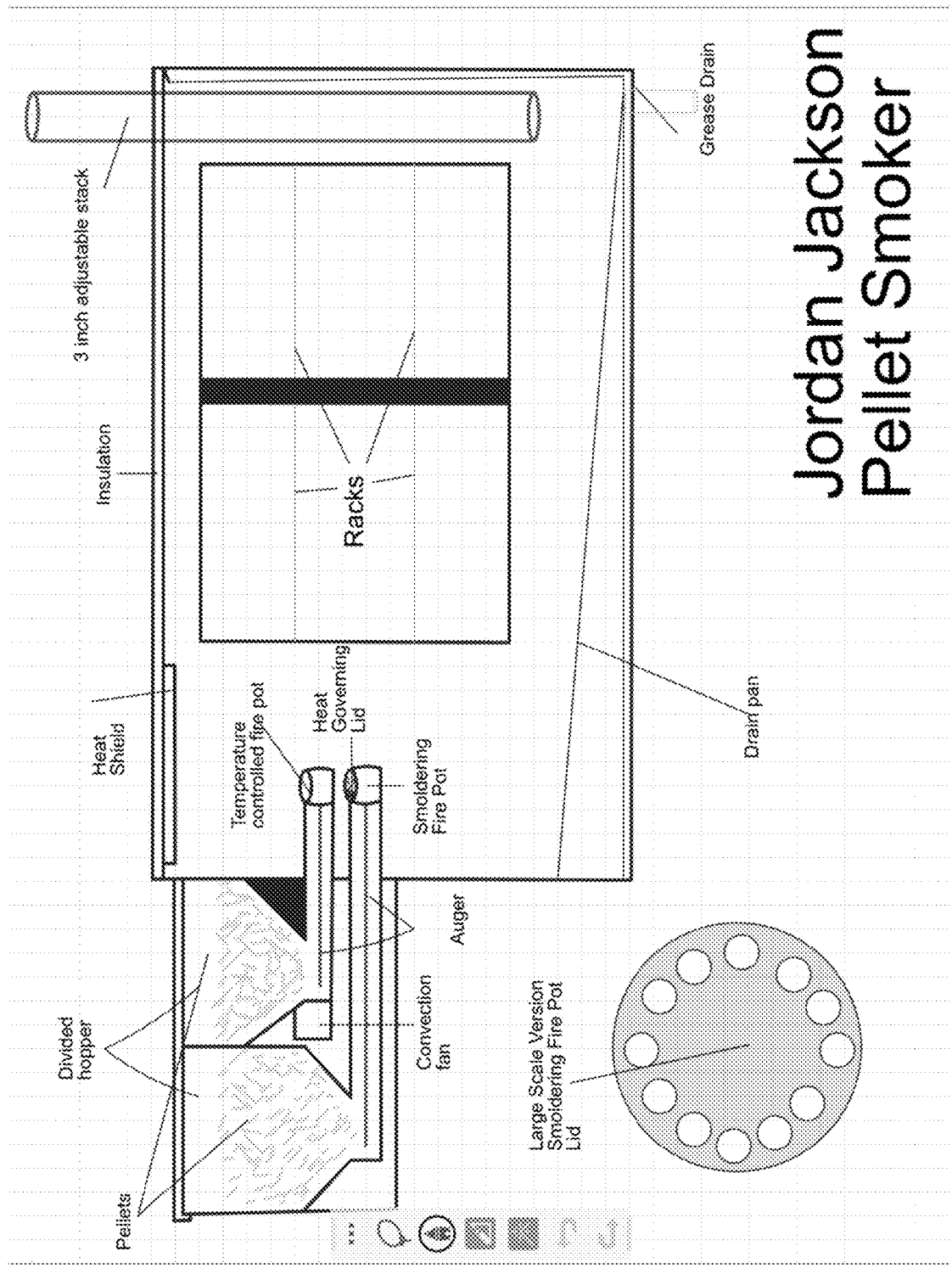
FIG. 1 is a diagram of a pellet-fed smoker according to an embodiment.

Referring now to FIG. 1, an embodiment of a smoker is shown having a first auger leading to a first fire pot and a second auger leading to a second fire pot. In the embodiment shown, the first fire pot is for controlling the temperature inside the smoker and is located above the second fire pot, which is for controlling the smoke inside the smoker. In other embodiments, the first fire pot may be located above the second fire pot, closer to the grilling surface than the second fire pot, next to the second fire pot, or below the second fire pot. The first fire pot and first auger may be used to control the temperature with a fire rod that heats the pellets and a convection fan that controls the oxygen delivered to the fire. The second auger may be used to send pellets to the second fire pot allowing them to smolder and, thereby, create more smoke inside the cooking area. In some embodiments, the second fire pot may have a perforated smoldering fire pot lid to govern the second fire pot. The lid may be solid in the center to reflect heat back while having slots, holes, or other openings to allow smoke to flow therethrough. The perforated lid may be adjustable to provide additional control over an amount of smoke created. The amount of air provided to a side or bottom of the second fire pot may also be controlled via, for example, a fan or an adjustable inlet. In some embodiments, a single auger for delivering pellets to two separate fire pots may be utilized and the percentage of pellets delivered to each fire pot may be controlled by the user to modify the heat and/or smoke coming from each fire pot. In some embodiments, one or both of the fire pots may include a way to clean out ash and other buildup in the fire pots. In some embodiments, a fire pot may include an air nozzle to blow the ash out. In some embodiments, the fire pots may include a screen, mesh, or other slotted surface to allow ash to fall out and may include an unslotted surface therebelow to minimize airflow when the fire pot is not being cleaned. In some embodiments, a heat shield, such as an adjustable slotted dome, may be located over one or more fire pots to reduce the heat flowing to the grilling/smoking area while still allowing smoke to flow. In some embodiments, the smoker may allow a food product to be smoked while the grilling/smoking area is maintained at a temperature range of 180° F. to 325° F. or temperatures above or below that range, depending on the cooking requirements.

In some embodiments, the first fire pot may be utilized to create a first flow of heat and smoke and the second fire pot may be utilized to produce a second flow of heat and smoke. In some embodiments, when the smoke from the second fire pot rises, it will become part of the first flow of heat and smoke to create more smoke without a significantly higher cooking temperature. In some embodiments, a metal heat shield may be located above the fire pots to protect from excessive amounts of heat and provide a convection-type heating to promote even and sustained cooking of a variety of different food products. In some embodiments, the smoker may have an adjustable stack to provide additional control of the flow of heat and smoke. In some embodiments, the stack may be able to be adjusted vertically and may include a lid to prevent water from entering the stack. In some embodiments, the stack may be a three-inch diameter tube or may be other shapes and sizes. In some embodiments, the stack may have an insulated handle, a hand-crank, notches, detents, and/or other ways to facilitate raising and lowering of the smoke stack to increase or decrease the amount of smoke in the smoking area.

In some embodiments, the smoker may have a rectangular design to allow even cooking with less hot spots. In some embodiments, the smoker may include a plurality of racks. In some embodiments, the smoker may have insulated interior walls to help hold in heat and maintain a more constant temperature inside. In some embodiments, the smoker may have a sloped drip pan for the grease to run down to a drain pipe so the grease and waste can exit the smoker. The drain pipe may include a gate valve on it to control the flow of grease and waste.

Figure 2:
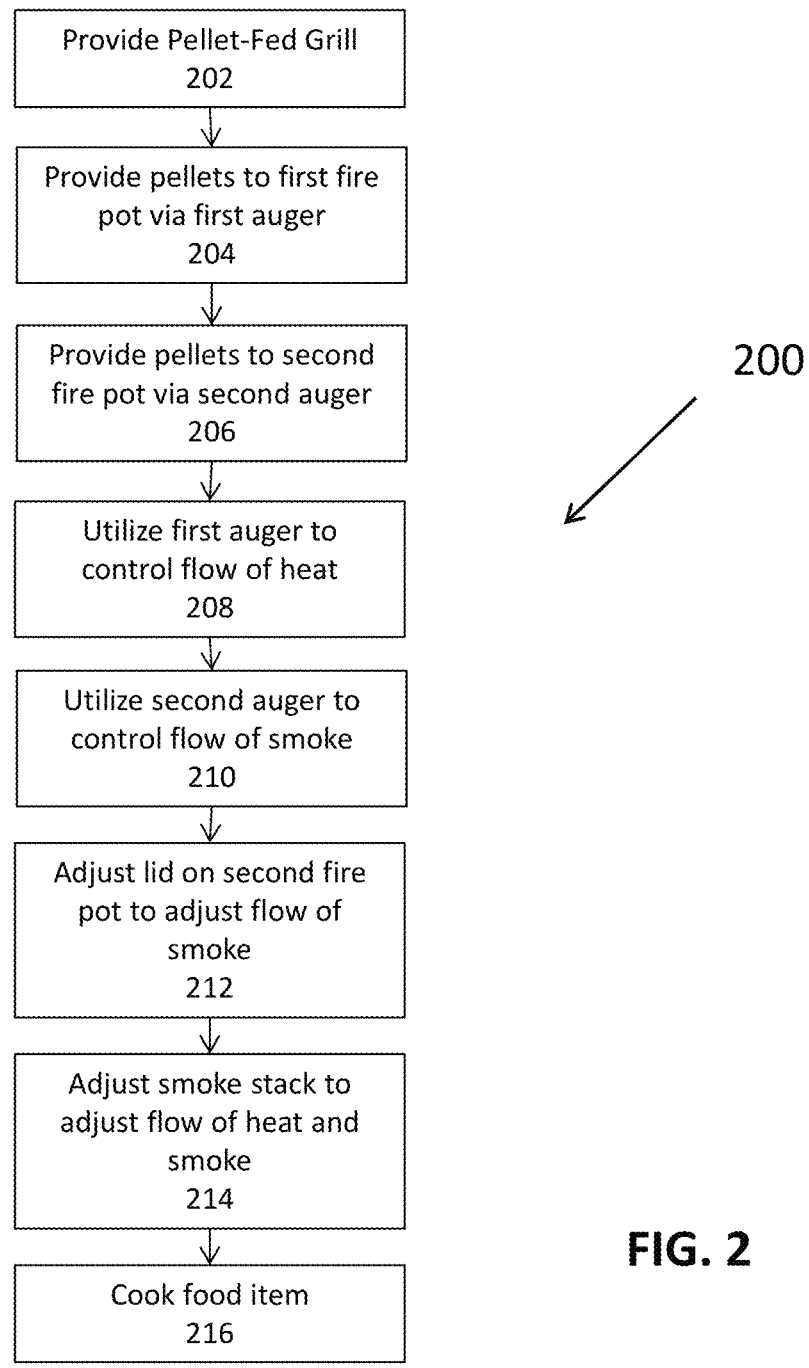
FIG. 2 is a flowchart of a method according to an embodiment.

Referring now to FIG. 2, a method 200 of using a pellet-fed grill to smoke a food product is shown. At step 202, a pellet-fed grill is provided having a source of pellets and first and second fire pots coupled to the source by first and second augers. At step 204, pellets are provided to the first fire pot via the first auger. At step 206, pellets are provided to the second fire pot via the second auger. At step 208, the first auger is adjusted to vary the speed at which the pellets are delivered in order to control the temperature inside the smoker. Other conditions may also be varied, such as the speed of the fan delivering oxygen to the first fire pot. At step 210, the second auger is adjusted to vary the speed at which the pellets are delivered in order to control the amount of smoke being delivered inside the smoker. At step 212, other conditions may also be varied, such as increasing or decreasing the size of the openings on the smoldering lid. At step 214, the smoke stack may be adjusted to vary the flow of heat and smoke. At step 216, the food item is cooked inside the smoker.

Referring now to U.S. Published Patent Application Number 2007/0137503, filed Dec. 16, 2005, the disclosure of which is hereby incorporated by reference as if fully set forth herein, this application describes an exemplary embodiment of a pellet-fired smoke generator. Referring now to U.S. Published Patent Application Number 2014/0326232, filed May 2, 2014, the disclosure of which is hereby incorporated by reference as if fully set forth herein, this application describes an exemplary embodiment of a dual-fuel gas-pellet burner assembly.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications, and substitutions without departing from the spirit and scope of the invention.

What is claimed is:

1. A pellet-fired smoker comprising:
a smoke chamber having a rack therein and a smoke stack with a hollow interior slidably extending therefrom, the smoke stack having an upper opening disposed outside the smoke chamber and a lower opening disposed inside the smoke chamber;
a hopper for receiving pellets therein coupled to the smoke chamber;
a first auger connected to the hopper for delivering pellets to a first fire pot located within the smoke chamber, the first fire pot configured to provide a first flow of heat and a first flow of smoke;
a second auger connected to the hopper for delivering pellets to a second fire pot located within the smoke chamber, the second fire pot configured to provide a second flow of heat and a second flow of smoke;
wherein the second fire pot has a perforated lid thereon for increasing an amount of smoke created when the pellets are burned in the second fire pot, thereby increasing the second flow of smoke without significantly increasing the second flow of heat; and
wherein sliding the smoke stack down into the smoke chamber lowers the lower opening to increase smoke within the smoke chamber and sliding the smoke stack up raises the lower opening to decrease the smoke within the smoke chamber.

2. The pellet-fired smoker of claim 1, wherein the perforated lid is generally circular with a plurality of circular holes disposed around a periphery thereof.

3. The pellet-fired smoker of claim 1, wherein the second fire pot is disposed below the first fire pot such that the second flow of smoke raises past the first fire pot and joins the first flow of smoke, thereby increasing an amount of smoke within the smoke chamber without significantly increasing the first flow of heat.

4. The pellet-fired smoker of claim 1, wherein the hopper is divided into two sections, a first section being connected to the first auger and a second section being connected to the second auger, wherein a speed of the first auger can be varied independent of a speed of the second auger.

5. An apparatus for increasing the smoke within a cooker, the apparatus comprising:
a first hopper chamber adapted to receive a first pellet fuel;
a second hopper chamber adapted to receive a second pellet fuel;
a smoke chamber having a floor, sides and a top, and including an adjustable smoke stack protruding from the top;
a pellet-burning assembly including a first auger connecting the first hopper to a first fire pot and a second auger connecting the second hopper to a second fire pot, the first and second fire pots being disposed inside the smoke chamber;

a blower adapted to supply air to the first fire pot;

wherein a speed of the first auger is adjustable to control a temperature inside the smoke chamber;

wherein the second fire pot includes a perforated lid that may be adjusted to control an amount of smoke created by the second fire pot; and wherein the second fire pot is disposed directly below the first fire pot.

6. The apparatus of claim 5, wherein the top of the first fire pot of the pellet-burning assembly is an open top.

7. The apparatus of claim 5, wherein sliding the smoke stack down into the smoke chamber lowers an opening of the smoke stack inside the smoke chamber to increase smoke within the smoke chamber and sliding the smoke stack up raises the opening to decrease the smoke within the smoke chamber.

8. The apparatus of claim 5, wherein the perforated lid is generally circular with a plurality of circular holes disposed around a periphery thereof.

9. The apparatus of claim 5, wherein the first pellet fuel and the second pellet fuel are different.

10. An apparatus for generating smoke, the apparatus comprising:

a pellet-burning assembly including an elongate housing, the pellet-burning assembly including:
  a first auger having, at one end, an opening for the receipt of pellet fuel and, at the other end, a first fire pot adapted to receive the pellet fuel;
  a second auger having, at one end, an opening for the receipt of pellet fuel and, at the other end, a second fire pot adapted to receive the pellet fuel;
  a blower adapted to supply air to the first fire pot; and
  an adjustable lip disposed over the second fire pot to control an amount of smoke created by the second fire pot; and a smoke chamber adapted to collect and emit smoke, the smoke chamber having a floor, sides and a top, the smoke chamber also including an adjustable smoke stack, wherein sliding the smoke stack down into the smoke chamber lowers an opening of the smoke stack inside the smoke chamber to increase smoke within the smoke chamber and sliding the smoke stack up raises the opening to decrease the smoke within the smoke chamber; and the first fire pot and the second fire pot being disposed within the smoke chamber, wherein the second fire pot is disposed below the first fire pot.

* * * * *